US012723173B2

(12) United States Patent
Chung

(10) Patent No.: US 12,723,173 B2
(45) **Date of Patent: *Sep. 1, 2026**

(54) MATTE CLEAR ANTI-FOULING ANTI-CORROSION SURFACE COATING AND USES THEREOF, AND MATTE CLEAR ANTI-FOULING ANTI-CORROSION SURFACE LAYER AND MATTE CLEAR ANTI- FOULING ANTI-CORROSION METAL

(71) Applicant: RAYOUNG CHEMTECH INC., New Taipei City (TW)

(72) Inventor: Chih Han Chung, New Taipei City (TW)

(73) Assignee: RAYOUNG CHEMTECH INC., New Taipei City (TW)

( * ) Notice: Subject to any disclaimer, the term of this patent is extended or adjusted under 35 U.S.C. 154(b) by 653 days.

This patent is subject to a terminal disclaimer.

(21) Appl. No.: 18/202,082

(22) Filed: May 25, 2023

(65) Prior Publication Data

US 2023/0383140 A1 Nov. 30, 2023

Related U.S. Application Data

(60) Provisional application No. 63/347,178, filed on May 31, 2022.

(51) Int. Cl.

| | |
|---|---|
| ***C09D 183/16*** | (2006.01) |
| ***B05D 5/02*** | (2006.01) |
| ***B05D 7/14*** | (2006.01) |
| ***C08L 83/04*** | (2006.01) |
| ***C08L 83/16*** | (2006.01) |
| ***C09D 5/08*** | (2006.01) |
| ***C09D 5/16*** | (2006.01) |
| ***C09D 7/20*** | (2018.01) |
| ***C09D 7/41*** | (2018.01) |
| ***C09D 7/63*** | (2018.01) |
| ***C09D 127/16*** | (2006.01) |
| ***C09D 167/00*** | (2006.01) |
| ***C09D 183/04*** | (2006.01) |
| *C09D 7/62* | (2018.01) |

(52) U.S. Cl.

CPC ............. *C09D 183/16* (2013.01); *B05D 5/02* (2013.01); *B05D 7/14* (2013.01); *C09D 5/082* (2013.01); *C09D 5/086* (2013.01); *C09D 5/1637* (2013.01); *C09D 5/1687* (2013.01); *C09D 7/20* (2018.01); *C09D 7/41* (2018.01); *C09D 7/63* (2018.01); *C09D 127/16* (2013.01); *C09D 167/00* (2013.01); *B05D 2202/35* (2013.01); *C08L 83/16* (2013.01); *C09D 7/62* (2018.01)

(58) Field of Classification Search

CPC ... C08D 183/16; C08D 183/00; C08D 183/04

See application file for complete search history.

(56) References Cited

U.S. PATENT DOCUMENTS

| | | | | |
|---|---|---|---|---|
| 8,277,929 | B2 * | 10/2012 | Yasuzawa | C09D 183/16 428/448 |
| 8,324,324 | B2 * | 12/2012 | Yang | C08L 83/16 525/476 |
| 8,329,830 | B2 * | 12/2012 | Yang | C08G 77/62 525/476 |
| 8,802,805 | B2 * | 8/2014 | Yang | C08G 77/62 528/28 |
| 2022/0064483 | A1 * | 3/2022 | Grottenmueller | C08G 77/62 |
| 2023/0383141 | A1 * | 11/2023 | Chung | C09D 183/16 |
| 2025/0084279 | A1 * | 3/2025 | Chung | C09D 183/14 |

FOREIGN PATENT DOCUMENTS

| | | | | |
|---|---|---|---|---|
| CN | 109321133 | A * | 2/2019 | C09D 183/16 |
| CN | 110128664 | A * | 8/2019 | C09D 5/08 |
| CN | 114539922 | A * | 5/2022 | B05D 7/14 |
| JP | 2014065814 | A * | 4/2014 | B05D 7/14 |
| KR | 20190114491 | A * | 10/2019 | C09D 7/40 |
| KR | 20190142533 | A * | 12/2019 | C09D 7/20 |
| KR | 20200065725 | A * | 6/2020 | B05D 3/067 |
| WO | WO-2021213916 | A1 * | 10/2021 | C09D 183/16 |

OTHER PUBLICATIONS

KR-20190142533-A (2019-12-27); machine translation. (Year: 2019).*

(Continued)

*Primary Examiner* — Rip A Lee

(74) *Attorney, Agent, or Firm* — Birch, Stewart, Kolasch & Birch, LLP

(57) ABSTRACT

A matte clear anti-fouling anti-corrosion surface coating and uses thereof, and a matte clear anti-fouling anti-corrosion surface layer and a matte clear anti-fouling anti-corrosion metal, wherein the matte clear anti-fouling anti-corrosion surface coating comprises: a fluorine-modified polysilazane and a solvent, wherein the content of the fluorine-modified polysilazane is approximately 5-80% by weight based on the total weight of the matte clear anti-fouling anti-corrosion surface coating. Accordingly, the coating can be applied to a corrosion-prone metal sheet or a corrosion-prone metal plate with a protective priming coat (a coated object). The coating is stain repellent, hydrophobic, anti-graffiti, corrosion resistant, clear, matte clear, resistant to temperature changes, resistant to impact, and tough among other characteristics, and is capable of not changing the original color or gloss of the coated object; the coating can be cured at room temperature for direct uses outdoors, and/or can be heated and cured for uses in factories. Additionally, the coating can also be applied directly on a surface of a metal that is not susceptible to rusting, wherein the coating can be applied directly after the addition of a matting agent, or without the addition of a matting agent and the coating can still be matte clear as described above.

13 Claims, No Drawings

(56) References Cited

OTHER PUBLICATIONS

CN-114539922-A (2022-05-27); machine translation. (Year: 2022).*
JP-2014065814-A (2014-04-17); machine translation. (Year: 2014).*

* cited by examiner

MATTE CLEAR ANTI-FOULING ANTI-CORROSION SURFACE COATING AND USES THEREOF, AND MATTE CLEAR ANTI-FOULING ANTI-CORROSION SURFACE LAYER AND MATTE CLEAR ANTI- FOULING ANTI-CORROSION METAL

CROSS-REFERENCE TO RELATED APPLICATIONS

This application claims priority to U.S. Provisional Patent Application No. 63/347,178, filed on May 31, 2022, and the disclosure of which is incorporated herein by reference thereto.

FIELD OF TECHNOLOGY

The present invention relates to a surface coating, uses thereof and products of the same and, in particular, to a matte clear anti-fouling anti-corrosion surface coating and uses thereof, and a matte clear anti-fouling anti-corrosion surface layer and a matte clear anti-fouling anti-corrosion metal.

BACKGROUND

Polyvinylidene difluoride (PVDF) is a highly non-reactive thermoplastic fluoropolymer. PVDF is primarily used in applications requiring repellency to solvents and resistance to acid and base corrosion. For example, PVDF can be used for making high-end paints for metals, which are in use on many prominent buildings around the world, such as the Petronas Towers in Malaysia and Taipei 101 in Taiwan. This kind of paint is used on commercial and residential metal roofing as well. When used for general and conventional building facades, PVDF fluoropolymer coating as the weather-resistant material has the advantages of durability and erosion resistance, and will not fade or deteriorate regardless of the sunlight or rain. In addition, PVDF fluoropolymer coating has good resistance to salt fog, possessing quite strong erosion resistance.

However, the disadvantage of a PVDF coating is that, if it is used outdoors, for example, when a subject is nailed on the PVDF coating on a galvanized steel sheet, the damaged area of the coating will rust. In addition, PVDF fluoropolymer coating requires high temperature (240-300° C.) heating, so it can only be processed in a factory and can not be used outdoors directly; and because of the high processing temperature, it can not be applied on a titanium sheet. In addition to inconvenience in processing, its processing temperature can also cause problems such as discoloration or deformation of a titanium sheet. In addition, PVDF has low hardness, only about HB hardness. The water contact angle (hydrophobic angle) and the sliding angle of PVDF is about 80-90 and about 40-50 degrees, respectively, and hence the stain-repellency of PVDF is also relatively low. Therefore, the anti-graffiti criteria can not be met, or it is difficult to clean.

The problem of being difficult to clean is that the cleaning staff will need to spend a lot of time to achieve required cleaning effect, and they might use strong acids or strong alkalis to clean in pursuit of efficiency, which will shorten the life of a building, or waste energy and resources.

Therefore, the drive for the present invention is to provide a surface coating, which can be applied on a PVDF fluoropolymer coating or applied directly on a material to be coated, retaining the original gloss, preventing rusting, increasing the surface hardness and avoiding chalking of the priming coat; and meanwhile, the challenge in processing the surface coating is reduced such that problems like discoloration and deformation can be avoided; and additionally, the surface coating is easy to wash with water and clean.

SUMMARY

In order to solve the above and other problems, one object of the present invention is to provide a matte clear anti-fouling anti-corrosion surface coating and uses thereof, and a matte clear anti-fouling anti-corrosion surface layer and a matte clear anti-fouling anti-corrosion metal.

A further object of the present invention is to provide a matte clear anti-fouling anti-corrosion surface coating to be applied directly on a corrosion-prone metal sheet with a protective priming coat, wherein the surface coating is stain repellent, hydrophobic, anti-graffiti, corrosion resistant, clear, matte clear, resistant to temperature changes, resistant to impact, and tough among other characteristics, the surface coating is capable of not changing the original color or gloss of the coated object; and the surface coating can be cured at room temperature for direct uses outdoors, and/or can be heated and cured for uses in a factory.

A further object of the present invention is to provide a matte clear anti-fouling anti-corrosion surface coating to be applied directly on a surface of a metal that is not susceptible to rusting, or on a surface of a corrosion-resistant metal, wherein the surface coating is stain repellent, hydrophobic, anti-graffiti, corrosion resistant, clear, matte clear, resistant to temperature changes, resistant to impact, and tough among other characteristics; the surface coating is capable of not changing the original color or gloss of the coated object; and the coating can be cured at room temperature for direct uses outdoors, and/or can be heated and cured for processing and uses in a factory.

In order to achieve the above and other object, provided in the embodiments of the present invention is a matte clear anti-fouling anti-corrosion surface coating, comprising: a fluorine-modified polysilazane and a solvent, wherein the content of the fluorine-modified polysilazane is approximately 5%-80% by weight based on the total weight of the matte clear anti-fouling anti-corrosion surface coating.

In one example, the fluorine-modified polysilazane is copolymerized by a fluoride, a siloxane and a silazane. Alternatively, the fluorine-modified polysilazane comprises a copolymer derived from a fluoride, a siloxane and a silazane.

In one example, by weight percentage, the fluoride accounts for approximately 10%-30%, the siloxane accounts for approximately 20%-30%, and the silazane accounts for approximately 40%-70%.

In one example, the fluorine-modified polysilazane comprises but is not limited to: poly(heptadecafluorodecyl methylsiloxane), poly(nonafluorohexyl siloxane), poly(methyl trifluoropropyl siloxane), polydimethylsiloxane, hexafluoropropylene oxide, perfluoropolyether sulfonic acid, trifluoromethyl trifluorovinyl ether, poly(tetrafluoroethylene-co-trifluoromethyl trifluorovinyl ether), perfluoro(propylvinyl ether), perfluoro(sulfonylvinyl ether), hexafluoroisobutylene, pentafluoroethyl trifluorovinyl ether, perfluoro-3,5-dioxahexyl vinyl ether or hexafluoropropylene oxide trimer vinyl ether.

In one example, the siloxane comprises but is not limited to polydimethylsiloxane (PDMS), methyl siloxane resins, cyclopentasiloxane, phenyl trimethicone, amodimethicone and cyclomethicone.

The object of the present invention is to provide a use of the matte clear anti-fouling anti-corrosion surface coating.

In one example, the matte clear anti-fouling anti-corrosion surface coating can be used as a top coating to be applied on a corrosion-prone metal sheet which is coated with a protective coating for metals, thereby providing extra protection and effects.

In one example, the matte clear anti-fouling anti-corrosion surface coating can be used as a top coating to be applied directly on a metal sheet that is not susceptible to corrosion, without a protective coating for metals.

One object of the present invention is to provide a matte clear anti-fouling anti-corrosion surface layer, wherein the matte clear anti-fouling anti-corrosion surface coating of one example is applied and then cured to form a layer by moisture at room temperature or by heat curing.

One object of the present invention is to provide a matte clear anti-fouling anti-corrosion metal prepared by binding the matte clear anti-fouling anti-corrosion surface coating of one example to a surface of a metal that is not susceptible to corrosion, or to a surface of a corrosion-resistant metal.

One object of the present invention is to provide a matte clear anti-fouling anti-corrosion metal prepared by binding the matte clear anti-fouling anti-corrosion surface coating of one example to a surface of a corrosion-prone metal sheet which is coated with a protective coating for metals.

In one example, the protective coating for metals comprises but is not limited to PVDF fluoropolymer, silicone modified polyester (SMP) coating, silicone modified PVDF (SMPF) coating or polyester (PE) coating. In order to provide additional protection, said matte clear anti-fouling and anti-corrosion surface coating can prevent, for example, PVDF or SMP or SMPF, from chalking and reduce problems like fading and deterioration thereof. Said matte clear anti-fouling and anti-corrosion surface coating can also prevent chalking of other coatings containing an acrylic component. In addition to preventing chalking and providing other additional protection, said matte clear anti-fouling and anti-corrosion surface coating can provide further benefits such as an anti-graffiti effect and an easy cleaning effect.

In one example, the corrosion-prone metal comprises but is not limited to an iron sheet, a steel sheet, a galvanized steel sheet, a nickel-plated iron sheet, a magnesium-aluminum-zinc alloy or an aluminium alloy.

In one example, the metal that is not susceptible to corrosion or the corrosion-resistant metal is a titanium or a titanium alloy.

DESCRIPTION OF THE EMBODIMENTS

Comparative Example 1

Gamet Primer W (Toa Resin Co. Ltd.) and Gamet #1000 (Toa Resin Co. Ltd.) were applied on a galvanized steel sheet (Yieh Phui Z27) as a priming coat and a top coat (or finishing coat), respectively, wherein the dry film thickness of the priming coat (or bottom coat) and the top coat was 5 μm and 20 μm, respectively, and a finished sheet was obtained after heating at 240° C. for 10 min each. After being fastened on a wooden board with screws, the finished sheet was subjected to tests for determination of the water contact angle, the sliding angle and the salt spray resistance. According to the test results, the water contact angle was 85±5 degrees, the sliding angle was 55±5 degrees, and the salt spray resistance test resulted in rusting around the screws.

Comparative Example 2

A Yieh Phui 2C energy-efficient coated steel pre-painted with a silicon modified polyester coating was used a plank. The dry film thickness of the priming coat and heating conditions were the same as in Comparative Example 1. After being fastened on a wooden board with screws, the finished sheet was subjected to tests for determination of the water contact angle, the sliding angle and the salt spray resistance. According to the test results, the water contact angle was 75±5 degrees, the sliding angle was 50±5 degrees, and the salt spray resistance test resulted in rusting around the screws.

Example 1

The matte clear anti-fouling anti-corrosion surface coating of the present invention (model: HyperDurays CP series) was applied on the finished sheet of Comparative Example 1 and then cured by moisture at room temperature. The finished product was obtained after 1-hour surface drying and 4-hour hardening. After being fastened on a wooden board with screws, the finished sheet of Example 1 was subjected to tests for determination of the water contact angle, the sliding angle and the salt spray resistance. According to the test results, the water contact angle was 107±5 degrees, the sliding angle was 15±5 degrees, and the salt spray resistance test resulted in no rusting.

Example 2

The matte clear anti-fouling anti-corrosion surface coating of the present invention (model: HyperDurays CP series) was applied on the finished sheet of Comparative Example 2 and then cured by moisture at room temperature. The finished product was obtained after 1-hour surface drying and 4-hour hardening. After being fastened on a wooden board with screws, the finished sheet of Example 2 was subjected to tests for determination of the water contact angle, the sliding angle and the salt spray resistance. According to the test results, the water contact angle was 107±5 degrees, the sliding angle was 15±5 degrees, and the salt spray resistance test resulted in no rusting.

In other words, both Examples 1 and 2 of the present invention have higher hydrophobicity (water contact angle and sliding angle) as well as higher salt spray resistance.

Hence, the matte clear anti-fouling anti-corrosion surface coating disclosed in the present invention is suitable as a top coating to be applied on a metal sheet which is coated with a protective coating for metals. The protective coating for metals may be a PVDF fluoropolymer coating, a silicone modified PVDF (SMPF) coating, a silicone modified polyester (SMP) coating, or a polyester (PE) coating. The metal sheet may be an iron sheet, an aluminum sheet, a steel sheet, a galvanized steel sheet, a nickel-plated iron sheet or any kind of a metal sheet which is suitable for steel panel walls.

Comparative Example 3

An easy-to-clean resin (Merck 1500RC) in combination with a propylene glycol methyl ether acetate (PMA) solvent, the weight percentage thereof being 10% and 90%, respectively, was used as an easy-to-clean coating to be applied on a surface of a titanium sheet (TC4, Heqiang Titanium Industry). The dry film thickness was 1 μm after the completion of hardening by moisture at room temperature, 1-hour surface drying and 4-hour hardening. Tests were conducted for determination of the water contact angle, the sliding angle, the ultraviolet accelerating aging (QUV weathering resistance), gloss and bending (0T "T" Bend). According to the test results, the water contact angle was 100±5 degrees, the sliding angle was 55±5 degrees, the gloss value at 60° was 640, and the coat fractured in a 0T bend. The contact angles before and after QUV weathering were: 200 hours, less than 100 degrees; 400 hours, less than 90 degrees; and 2000 hours, less than 80 degrees.

According to the analysis of the results of Comparative Example 3, the previously uncoated titanium sheet had gloss at 60° of 800, which changed to 640 after coating, and hence the metal sheet was still reflective and could cause light pollution to building facades. Although the contact angle increased after coating, leading to an effect of easy cleaning, the weather resistance was poor; and additionally, the coat is prone to fracturing when the bending angle of the titanium panel is too large during actual outdoor applications.

Comparative Example 4

An easy-to-clean resin (Merck 1800RC) was mixed with a propylene glycol methyl ether acetate (PMA) solvent, the weight percentage thereof being approximately 10% and approximately 90%, respectively, and a matting agent (Fuji SylysiaSY-350) of 0.03% by weight percentage was added, giving an easy-to-clean coating to be applied on a surface of a titanium sheet (TC4, Heqiang Titanium Industry). The dry film thickness was 1 μm after the completion of hardening by moisture at room temperature, 1-hour surface drying and 4-hour hardening. Tests were conducted for determination of the water contact angle, the sliding angle, the gloss and bending (0T "T" Bend). According to the test results, the water contact angle was 100±5 degrees, the sliding angle was 55±5 degrees, the gloss value at 60° was 318, and the coat fractured in a 0T bend.

According to the analysis of the results of Comparative Example 4. the previously uncoated titanium sheet had a gloss at 60° of 800, which changed to 318 after coating. Although the titanium sheet was not reflective, the original metallic luster of the titanium plate was not exhibited because of the opaque white matting agent. Moreover, the coat is prone to fracturing when the bending angle of the titanium sheet is too large during actual outdoor applications. Additionally, the addition of the matting agent might even destroy the metal structure because of thermal expansion and contraction thereof.

Example 3

The matte clear anti-fouling anti-corrosion surface coating of the present invention (model: HyperDurays CP series) was applied on a surface of a titanium sheet (TC4, Heqiang Titanium Industry). The dry film thickness was 1 μm after the completion of hardening by moisture at room temperature, 1-hour surface drying and 4-hour hardening. Tests were conducted for determination of the water contact angle, the sliding angle, the gloss and bending (0T "T" Bend). According to the test results, the water contact angle was 107±5 degrees, the sliding angle was 15±5 degrees, the gloss value at 60° was 540, and the coating was intact with no fracture in a 0T bend. The contact angles before and after QUV weathering were: 200 hours, less than 112 degrees; 400 hours, less than 110 degrees; and 2000 hours, less than 108 degrees.

According to the analysis of the results of Example 3, the previously uncoated titanium sheet had gloss at 60° of 800, which changed to 540 after coating, thereby causing no light pollution to building facades any more but retaining a matte metallic luster. Meanwhile, the coated metal had an effect of easy cleaning and is weather resistant. Moreover, the titanium sheet can be bended to a large enough angle during actual outdoor applications and the coat is not susceptible to fracturing.

Hence, the matte clear anti-fouling anti-corrosion surface coating disclosed in the present invention is suitable for applications as a top coating to be applied directly on a metal sheet. Here, the metal is a titanium alloy. It is worth mentioning that the matte effect of the matte clear anti-fouling anti-corrosion surface coating does not require an addition of another material like a matting agent.

In order to verify the technical effects of the above examples, organizations including the SGS Material and Engineering Laboratory, the Taiwan Paint Industry Association and the Industrial Technology Research Institute of Taiwan were further commissioned to verify the present invention, and the tests included: gloss, dry film hardness, adhesion, impact resistance, abrasion resistance, chemical resistance, dry film thickness, humidity resistance, water contact angle, cyclic corrosion test, weather resistance and salt spray test among others.

Table 1 shows the test apparatus. Table 2 shows the test conditions. Table 3 shows the test results.

TABLE 1

Test Apparatus

| Name | Brand | Model |
|---|---|---|
| Micro-TRI-Gloss Gloss Meter | BYK | 4446 |
| Pencil | MITSU-BISHI uni | N/A |
| Impact Tester | BYK | 5512 |
| Humidity Tester | J.T.M. Technology | JTM-1274 |
| Cyclic Corrosion Tester | Q-LAB | Q-Fog/CRH1100HSC |
| Coating Thickness Gauge | QuaNix | 8500 Basic C |
| Q-SUN Xe-3 Xenon Arc Test Chamber | Q-LAB | Q-SUNXe-3-HBS |
| Spectrophotometer | MINOLTA | CM-3600d |
| Contact Angle Meter | ASTP | VCA Optima XE |
| Salt Spray Tester | ERICHSEN | 606/400I |

TABLE 2

| Test Conditions | |
|---|---|
| **Cyclic Corrosion Test** | |
| Test solution | 0.05% NaCl + 0.35% $(NH_4)_2SO_4$ |
| Conditions of each cycle | One-hour fog + one-hour dry-off |
| Chamber temperature during the fog condition (° C.) | 24 ± 3 |
| Chamber temperature during the dry-off condition (° C.) | 35 ± 1.5 |
| Spray volume (ml/hr/80 $cm^2$) | 1.0-2.0 |
| pH value of collected salt fog | 5.0-5.4 |
| Specimen placement angle | 15-30 |
| **Weather Resistance** | |
| Lamp | Xenon-arc lamp |
| Filter | Daylight |
| Irradiance | 0.35 $W/m^2/nm$ @340 nm |
| Conditions of each cycle | 102-minute irradiation (@ Black Panel Temperature 63° C.) + 18-minute irradiation and water spray |
| **Salt Spray Test** | |
| Salt solution | 5 wt. % NaCl solution |
| pH value of the salt solution | 6.5-7.2 |
| Spray chamber temperature (° C.) | 35 ± 2 |
| Spray volume (ml/hr/80 $cm^2$) | 1.0-2.0 |

TABLE 3

| Test Results | | |
|---|---|---|
| Test | Test method | Test result |
| Gloss (60°) | ASTM D523-14 (2018) | 47 |
| Dry film hardness (scratch) | ASTM D3363-05 (2011) | 4H |
| Adhesion | AAMA 2605-17a, | |
| a. Dry film | ASTM D3359-17 | 5B |
| b. Wet film | | 5B |
| c. Boiling water | | 5B |
| Impact resistance (deformation of 3 ± 0.3 mm, 5/8", 134 in-lb) | AAMA 2605-17a, ASTM D2794-93 (2019) | No removal of coating from the substrate |
| Abrasion resistance (L/mil.) | ASTM D968-17 A | 28 |
| Chemical resistance | AAMA 2605-17a, | |
| a. Muriatic acid resistance (15 mins) | ASTM D2244-16 | No blistering and no visual change in appearance when examined by the unaided eye. |
| b. Mortar resistance (38° C., 100% RH, 24 h) | | No loss of coating adhesion or visual change in appearance when examined by the unaided eye. |
| c. Detergent resistance (3%, 72 h) | | No loss of coating adhesion or visual change in appearance when examined by the unaided eye. No removal of coating under the tape; 100% adhesion. |
| d. Nitric acid resistance (30 mins) | | No visual change in appearance when examined by the unaided eye and ΔE equaled to 1.15. |
| e. Window cleaner resistance (24 h) | | No loss of coating adhesion or visual change in appearance when examined by the unaided eye. No removal of coating under the tape; 100% adhesion. |
| Dry film thickness (μm) | ASTM-D7091-13 | 16.2 |
| Humidity resistance (100° F., 100% RH, 4000 h) | AAMA 2605-17a | No abnormalities in visual appearance |
| Water contact angle (degrees) | ASTM D7334-08 (2013) | 111.1 ± 1.2 |
| Cyclic Corrosion Test (2000 h) | AAMA 2605-17a, G85-11, | |
| a. Appearance | ASTM D7334-08 (2013) | No abnormalities in visual appearance |
| b. Water contact angle (degrees) | | 105.3 ± 0.6 |
| Weather Resistance | ASTM G155-13, ASTM D523- | |
| a. Appearance | 14 (2018), ASTM D4214-07 (2015), ASTM D7334-08 | No abnormalities in visual appearance |
| b. Gloss retention (%) | (2013) | 76.6 |
| c. Chalking | | No chalking |
| d. Water contact angle (degrees) | | 103.8 ± 1.3 |
| Salt Spray Test (4000 h) | ASTM B117-18, ASTM D7334-08 (2013) | No rusting in visual appearance |

In summary, the matte clear anti-fouling anti-graffiti anti-corrosion surface coating of the present examples comprising fluorine-modified polysilazane can be applied directly on a corrosion-prone metal sheet with a protective priming coat; the surface coating is stain repellent, hydrophobic, anti-graffiti, corrosion resistant, clear, matte clear, resistant to temperature changes, resistant to impact, and tough among other characteristics. The surface coating is also capable of not changing the original color or gloss of the coated object. The coating can be cured at room temperature for direct uses outdoors, and/or can be heated and cured for uses in a factory. Additionally, the matte clear anti-fouling anti-graffiti anti-corrosion surface coating of the examples herein can also be applied directly to a surface of a metal that is not susceptible to rusting. The surface coating herein can be applied directly after the addition of a matting agent, or without the addition of a matting agent and the coating is still matte clear as described above.

The invention claimed is:

1. A matte clear anti-fouling anti-corrosion surface coating comprising: a fluorine-modified polysilazane and a solvent, wherein a content of the fluorine-modified polysilazane is approximately 5%-80% by weight based on a total weight of the matte clear anti-fouling anti-corrosion surface coating wherein the fluorine-modified polysilazane comprises a copolymer derived from a fluoride, a siloxane and a silazane; wherein by weight percentage, the fluoride accounts for approximately 10%=–30%, the siloxane accounts for approximately 20%=–30%, and the silazane accounts for approximately 40%=–70%.

2. The matte clear anti-fouling anti-corrosion surface coating of claim 1, wherein the fluorine-modified polysilazane comprises but is not limited to: poly(perfluorodecyl methylsiloxane), poly(nonafluorohexyl siloxane), poly(methyl trifluoropropyl siloxane), polydimethylsiloxane, hexafluoropropylene oxide, perfluoropolyether sulfonic acid, trifluoromethyl trifluorovinyl ether, poly(tetrafluoroethylene-co-trifluoromethyl trifluorovinyl ether), perfluoro(propylvinyl ether), perfluoro(sulfonylvinyl ether), hexafluoroisobutylene, pentafluoroethyl trifluorovinyl ether, perfluoro-3,5-dioxahexyl vinyl ether or hexafluoropropylene oxide trimer vinyl ether.

3. The matte clear anti-fouling anti-corrosion surface coating of claim 1, wherein the siloxane comprises but is not limited to polydimethylsiloxane (PDMS), methyl siloxane resin, cyclopentasiloxane, phenyl trimethicone, amodimethicone or cyclomethicone.

4. The matte clear anti-fouling anti-corrosion surface coating of claim 1, wherein the surface coating is used as a top coating to be applied on a metal sheet which is coated with a protective coating for metals.

5. The matte clear anti-fouling anti-corrosion surface coating of claim 4, wherein the protective coating for metals comprises but is not limited to: a fluoropolymer coating, a silicone modified polyester (SMP) coating, a silicone modified PVDF (SMPF) coating or a polyester (PE) coating.

6. The matte clear anti-fouling anti-corrosion surface coating of claim 4, wherein the metal sheet comprises but is not limited to an iron sheet, a steel sheet, a galvanized steel sheet, a nickel-plated iron sheet, a magnesium-aluminum-zinc alloy sheet or an aluminium alloy sheet.

7. The matte clear anti-fouling anti-corrosion surface coating of claim 1, wherein the surface coating is used to be applied directly to a metal sheet as a top coating.

8. The matte clear anti-fouling anti-corrosion surface coating of claim 7, wherein the metal sheet comprises but is not limited to a titanium sheet or a titanium alloy sheet.

9. A matte clear anti-fouling anti-corrosion surface layer, comprising the matte clear anti-fouling anti-corrosion surface coating of claim 1 that is applied and then hardened into a layer by moisture at room temperature or by heat curing.

10. A matte clear anti-fouling anti-corrosion metal, comprising:

a metal having a metal surface; and the matte clear anti-fouling anti-corrosion surface coating of claim 1 disposed on the metal surface;

wherein, the metal surface is a corrosion-resistant metal surface, or a corrosion-prone metal surface with a protective coating for metals.

11. The matte clear anti-fouling anti-corrosion metal of claim 10, wherein the corrosion-resistant metal comprises but is not limited to a titanium or a titanium alloy.

12. The matte clear anti-fouling anti-corrosion metal of claim 10, wherein the corrosion-prone metal comprises but is not limited to an iron, a steel, a galvanized steel, a nickel-plated iron, a magnesium-aluminum-zinc alloy or an aluminium alloy.

13. The matte clear anti-fouling anti-corrosion metal of claim 10, wherein the protective coating for metals comprises but is not limited to: a fluoropolymer coating, a silicone modified polyester (SMP) coating, a silicone modified PVDF (SMPF) coating or a polyester (PE) coating.

* * * * *